Dec. 14, 1965   M. REYNOLDS, JR   3,222,721
DUAL EXTRUSION APPARATUS
Filed June 25, 1962
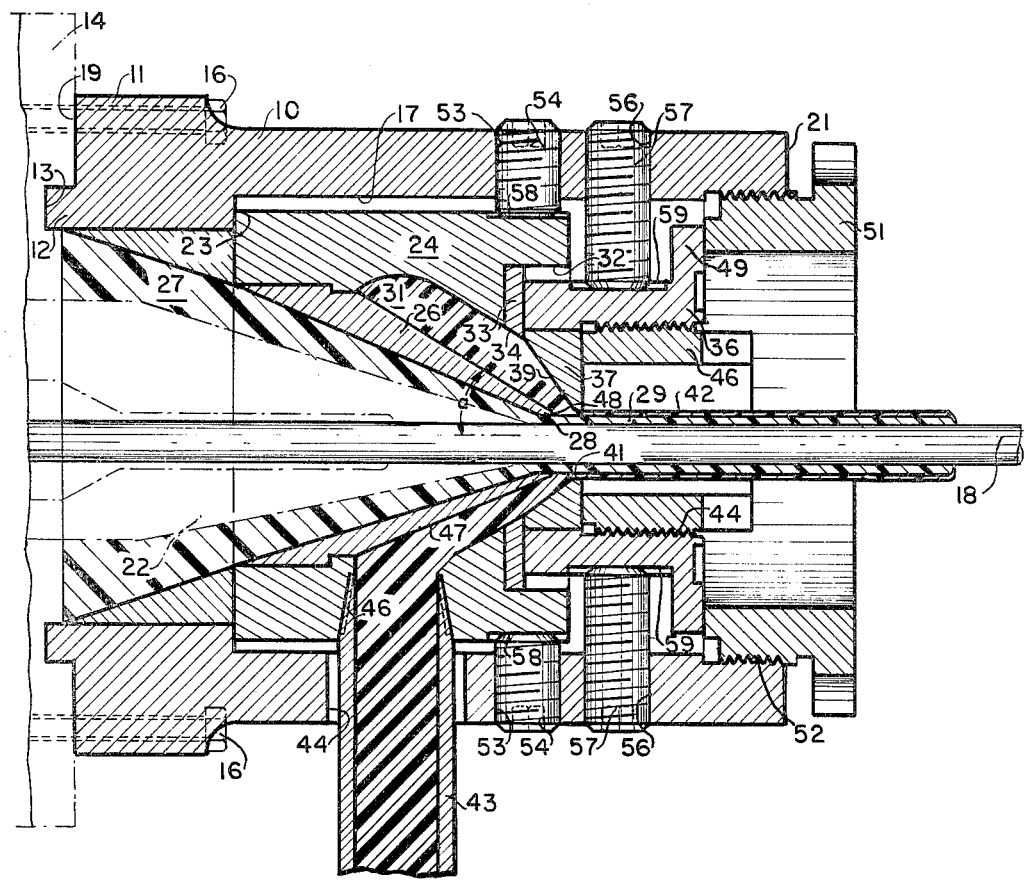
INVENTOR.
MAURICE REYNOLDS Jr
BY *V. F. Volk*
HIS AGENT United States Patent Office 3,222,721
Patented Dec. 14, 1965

3,222,721
DUAL EXTRUSION APPARATUS
Maurice Reynolds, Jr., Marion, Ind., assignor, by mesne assignments, to Anaconda Wire and Cable Company, a corporation of Delaware
Filed June 25, 1962, Ser. No. 204,871
7 Claims. (Cl. 18—13)

My invention relates to an extrusion apparatus and particularly to apparatus for continuously extruding multilayered coverings over an advancing strand.

In the covering of strands and particularly in the application of electrical insulation over metallic conductors it is often necessary to apply the insulation in concentric layers of different materials. These may be two insulating layers of different colors, or they may be a layer of insulation plus a protective jacket. Known methods of applying multiple layers by extrusion require two different operations. First one layer is extruded and the insulated product is taken up on a reel. The insulated strand is then paid off into a jacketing extruder and taken up on another reel. Efforts to apply two or more concentric coatings in one operation have been frustrated by the difficulty of making the necessary centering adjustments of the dies in the extrusion apparatus. In extrusion operations it is necessary to make minor adjustments in the centering of dies relative to the strands advancing through them for a perfectly centered die does not, as a rule, result in a perfectly centered insulation due to variations of feed into the die. I have now invented, and herein describe, an apparatus capable of extruding two or more layers, wherein the necessary dies can be adjusted, during operation, to produce a uniform wall thickness in each layer.

My apparatus is particularly easy to assemble and disassemble from an extruder, and this is an important advantage since it reduces expensive down-time on each machine.

Additionally my apparatus affords simple means of varying the clearance between dies and of removing the outer die without disturbing the remainder of the apparatus.

To provide these features I have invented an apparatus for extruding multilayered strand covering comprising a tubular housing and two extrusion dies within the housing. The dies are preferably held in die-holders within the housing and means are provided to prevent lateral movement of the die-holders and dies.

Preferably my first die has an outer conical surface tapering at an acute angle to the axis of the strand and both dies have extrusion apertures the aperture of the second die being greater than that of the first die. The first and second dies and die-holder for the first die form at least some of the walls defining an annular space and my apparatus comprises an entrance through the housing communicating with this space. It also comprises means passing through the housing for adjusting the transverse position of the die-holder for the first die and other means passing through the housing for independently adjusting the transverse position of the second die.

My housing comprises entrance and exit ends and preferably an internal shoulder adjacent the entrance end and a length of threaded surface adjacent the exit end. A nut threads onto this surface so as to lockingly urge the die holders and dies toward the shoulder.

A more thorough understanding of my invention may be gained from the appended drawing.

In the drawing:

The figure is a lengthwise section through an apparatus made in accordance with my invention.

A tubular housing 10 has a flange 11 with a projection 12 matching a recess 13 in an extruder head 14 which enables the housing 10 to be fastened to the head 14 by means of bolts 16. The housing 10 has a bore 17, preferably cylindrical, within which the necessary extrusion dies can be fitted and through which a strand 18 can pass from an entrance end 19 to an exit end 21. In entering the housing 10 the strand 18 is positioned relative to the extruder by a close fitting guider 22 held in a known manner by means, not shown, that prevent any transverse movement.

The housing 10 has an internal shoulder 23 at the entrance end, and a die-holder 24 enclosed in the housing 10 is prevented from moving laterally to the left (as seen in the drawing) by abutting against the shoulder 23. The die-holder 24 holds an extrusion die 26 which is coaxial with the guider 22 and spaced therefrom to provide an annular space 27 which is filled with the plastic, rubber, or other material being extruded over the strand 18. The walls of the extrusion die 26 define an extrusion aperture 28 larger than the strand 18 so that strand exiting from the die 26 is coated with a uniform covering 29.

The interior of the die-holder 24 is recessed to provide a space or clearance 31 around the die 26.

The die-holder 24 is countersunk to provide a cylindrical wall 32 into which is fitted a spacing disc 33 with a tapered inner aperture 34 which provides clearance from a second die-holder 36. This die-holder 36 holds a second extrusion die 37 coaxially to the die 26. The surface 34 of the spacer 33 and a wall 39 of the die 37 form the remaining outer surface of the annular space 31 into which a second covering material may be introduced. This material enters an extrusion aperture 41 in the die 37 which is larger than the aperture 28 of the die 26 so that a layer 42 is deposited over the layer 29 on the strand 18. To feed covering material into the space 31 a pipe 43 passes through an opening 44 in the housing 10 and through an opening 46 in the die-holder 26. The other end of the pipe 43 is fed by a second extruder not shown.

The inside surface of the die holder 36 has threads 44 matching the external threads of a locknut 46 which holds the die 37 against the disc 33.

It has been known to make the guider 22 adjustable laterally by means not shown so that the clearance 27 can be increased or decreased as desired. In my invention the clearance 31 between the dies 26 and 37 can also be regulated by changing the disc 33 to one of greater or lesser thickness. The shape of the annular space 31 is selected to provide smooth and even flow of material from the pipe 43 to the aperture 41 and must be free from any obstruction or dead-spots where material might accumulate and scorch. The die 26 has a conical outer surface 47 which forms an acute angle $\alpha$ with the outer surface of the covering 29 and extends down almost to the covering 29 in an unbroken, sloping surface. The angle $\alpha$ and the spacing is such that the die 26 actually enters within the approach formed by the wall 39 of the die 37. Although, from the viewpoint of uninterrupted flow of material I would prefer to bring the surface cone 47 sharply to the surface of the covered strand as a practical matter it is necessary to avoid too sharp an edge which might become nicked or broken and I provide a flat 48, 1/100 of an inch in radial thickness at the exit end of the die. The die-holder 36 has a flange 49 which is engaged by a nut 51 threading onto a threaded surface 52 of the housing 10. The die holders 36 and 24 are thus locked between the shoulder 23 and the nut 51 and this can be accomplished by the single simple operation of inserting and tightening a nut. It will be understood that although I prefer the internal thread 52 the thread might be cut on the outside of the housing 10 and an internally threaded cap substituted for the nut 51.

The housing 10 has four tapped radial holes 53, 90° apart, into which are threaded four adjusting bolts 54 and an additional four tapped holes 56, 90° apart, fitting a like number of bolts 57. Four flats 58 are machined in the surface of the die-holder 24 to receive the pressure of the bolts 54 and four flats 59 are machined in the surface of the die-holder 36 to receive the pressure of the bolts 57. By means of the bolts 54 the die-holder 24 and thus the die 26 can be adjusted transversely to correct any eccentricity of the covering 29, and by means of the bolts 57 the die-holder 36 and thus the die 37 can be transversely adjusted to correct any eccentricity in the covering 42.

I have invented a new and useful apparatus for which I desire an award of Letters Patent.

I claim:

1. An apparatus for extruding multilayered strand covering, comprising:
    (A) a tubular housing,
    (B) a tubular die-holder within said housing,
    (C) means restraining said die-holder from lateral movement within said housing,
    (D) a first extrusion die within said die-holder
        (a) having walls defining a first extrusion aperture,
    (E) a second extrusion die within said housing
        (a) coaxial with said first die and
        (b) having walls defining a second extrusion aperture larger than said first aperture,
    (F) means cooperating with said die-holder to restrain said second die from lateral movement within said housing,
    (G) said first and second dies and said die-holder forming at least some of a plurality of walls defining an annular space communicating with said second aperture,
    (H) an entrance through said housing communicating with said space,
    (I) means passing radially through said housing for adjusting the transverse position of said die holder, and
    (J) means passing radially through said housing for independently adjusting the transverse position of said second die,
    (K) means at one end of said housing locking said dies and said die-holder therein, said dies and said die-holder being easily removable from said housing through said end upon the release of said locking means.

2. An apparatus for extruding multilayered strand covering, comprising:
    (A) a tubular housing,
    (B) a first tubular die-holder within said housing,
    (C) means restraining said die-holder from lateral movement within said housing,
    (D) a first extrusion die within said die-holder
        (a) having walls defining a first extrusion aperture,
    (E) a second tubular die-holder within said housing,
    (F) means cooperating with said first die-holder to restrain said second die-holder from lateral movement within said housing,
    (G) a second die within said second die-holder,
        (a) coaxial with said first die, and
        (b) having walls defining a second extrusion aperture larger than said first aperture,
    (H) said first and second dies and said first die-holder forming at least some of a plurality of walls defining an annular space communicating with said second aperture,
    (I) an entrance through said housing communicating with said space,
    (J) means passing radially through said housing for adjusting the transverse position of said first die-holder, and
    (K) means passing radially through said housing for independently adjusting the transverse position of said second die-holder,
    (L) means at one end of said housing locking said dies and said die-holders therein, said dies and said die-holders being easily removable from said housing through said end upon the release of said locking means.

3. An apparatus for extruding multilayered strand covering, comprising:
    (A) a tubular housing comprising:
        (a) an entrance end,
        (b) an exit end,
        (c) means fastening said entrance end to an extruder head,
        (d) an internal shoulder adjacent said entrance end,
        (e) a length of threaded surface adjacent said exit end,
    (B) a first die-holder
        (a) within said housing
        (b) abutting said shoulder,
    (C) a first extrusion die
        (a) held in said die-holder and
        (b) having walls defining a first extrusion aperture,
    (D) a second tubular die-holder within said housing,
    (E) a second die
        (a) held in said second die-holder
        (b) having walls defining an aperture larger than said first aperture,
    (F) a nut threading onto said threaded surface so as to lockingly urge said die-holders toward said shoulder,
    (G) means passing radially through said housing for adjusting said first die holder,
    (H) means passing radially through said housing for independently adjusting said second die-holder,
    (I) said dies and said die-holders being easily removable from said housing through said exit end upon the removal of said nut.

4. An apparatus for extruding multilayered strand covering comprising:
    (A) a tubular housing comprising:
        (a) an entrance end,
        (b) an exit end,
        (c) means fastening said entrance end to an extruder head,
        (d) an internal shoulder adjacent said entrance end,
        (e) a length of threaded surface adjacent said exit end,
    (B) a first die-holder
        (a) within said housing
        (b) abutting said shoulder,
    (C) a first extrusion die
        (a) held in said die holder and
        (b) having walls defining a first extrusion aperture,
    (D) a second tubular die-holder within said housing,
    (E) a second die
        (a) held in said second die-holder and
        (b) having walls defining an aperture larger than said first aperture,
    (F) said first die-holder and said first and second dies forming walls defining an annular space communicating with said second die aperture,
    (G) an entrance through said housing communicating with said space,
    (H) a nut threading onto said threaded surface so as to lockingly urge said die-holders toward said shoulder,
    (I) means passing radially through said housing for adjusting said first die holder,
    (J) means passing radially through said housing for independently adjusting said second die-holder,
    (K) said dies and said die-holders being easily removable from said housing through said exit end upon the removal of said nut.

5. An apparatus for extruding multilayered strand covering, comprising:
(A) a tubular housing comprising:
  (a) an entrance end,
  (b) an exit end,
  (c) means fastening said entrance end to an extruder head,
  (d) an internal shoulder adjacent said entrance end,
  (e) a length of threaded surface adjacent said exit end,
(B) a first die-holder
  (a) within said housing
  (b) abutting said shoulder,
(C) a first extrusion die
  (a) held in said die holder and
  (b) having walls defining a first extrusion aperture,
(D) a second tubular die-holder
  (a) within said housing and
  (b) having an internal thread,
(E) a second die
  (a) held in said second die-holder and
  (b) having walls defining an aperture larger than said first aperture,
(F) an externally threaded locknut
  (a) fitting said thread in said die-holder
  (b) so as to lockingly engage said second die in cooperation with said first die-holder,
(G) means passing radially through said housing for adjusting said first die holder,
(H) means passing radially through said housing for independently adjusting said second die holder,
(I) means at one end of said housing locking said die-holders and said dies therein, said dies and said die-holders being easily removable from said housing through said end and said second die being slidably removable from said second die-holder without removing said locknut upon the release of said locking means.

6. An apparatus for extruding multilayered strand covering, comprising:
(A) a tubular housing comprising:
  (a) an entrance end,
  (b) an exit end,
  (c) means fastening said entrance end to an extruder head,
  (d) an internal shoulder adjacent said entrance end,
  (e) a length of threaded surface adjacent said exit end,
(B) a first die-holder
  (a) within said housing
  (b) abutting said shoulder and
  (c) having an internally projecting ledge,
(C) a first extrusion die
  (a) held in said die holder and
  (b) having walls defining a first extrusion aperture,
(D) a second tubular die-holder
  (a) within said housing and
  (b) having an internal thread,
(E) a second die
  (a) coaxial with said first die
  (b) held in said second die-holder and
  (c) having walls defining an aperture larger than said first aperture,
(F) a spacer disc
  (a) between said ledge and said second die-holder,
(G) an externally threaded locknut
  (a) fitting said thread in said die-holder
  (b) so as to lockingly engage said second die,
(H) said first die-holder, said first and second dies, and said disc forming walls defining an annular space communicating with said second die aperture,
(I) an entrance through said housing communicating with said space,
(J) a nut threading onto said threaded surface so as to lockingly urge said die holders toward said shoulder,
(K) means passing radially through said housing for adjusting said first die holder,
(L) means passing radially through said housing for independently adjusting said second die holder.

7. An apparatus for extruding multilayered strand covering, comprising:
(A) a tubular housing,
(B) a first extrusion die
  (a) within said housing and
  (b) having walls defining a first extrusion aperture,
  (c) said die having an outer conical surface, tapering at an acute angle to the axis of said strand,
(C) a second extrusion die within said housing
  (a) coaxial with said first die and
  (b) having walls defining an extrusion aperture larger than said first aperture,
(D) said first and second dies forming at least some of a plurality of walls defining an annular space communicating with said second die aperture,
(E) an entrance through said housing communicating with said space,
(F) means passing radially through said housing for adjusting the transverse position of said first die, and
(G) means passing radially through said housing for independently adjusting the transverse position of said second die,
(H) means at one end of said housing locking said dies therein, said dies being easily removable from said housing through said end upon the release of said locking means.

References Cited by the Examiner

UNITED STATES PATENTS

| | | | |
|---|---|---|---|
| 1,934,647 | 11/1933 | State et al. | 18—13 |
| 2,235,688 | 3/1941 | Short | 18—13 |
| 2,641,800 | 6/1953 | Myers | 18—13 |
| 2,642,898 | 6/1953 | Acock et al. | 18—13 |
| 2,760,230 | 8/1956 | Van Riper | 18—13 |
| 2,790,202 | 4/1957 | Lorenian | 18—13 |
| 3,121,255 | 2/1964 | Henning et al. | 18—13 |

FOREIGN PATENTS

| | | |
|---|---|---|
| 1,080,646 | 4/1960 | Germany. |
| 203,372 | 8/1923 | Great Britain. |

WILLIAM J. STEPHENSON, *Primary Examiner.*

MICHAEL V. BRINDISI, *Examiner.*